United States Patent [19]

Kasahara et al.

[11] 4,034,506
[45] July 12, 1977

[54] HYDROPONIC METHOD USING A POROUS FOAM PLATE, AND A CONTAINER USED THEREWITH

[75] Inventors: Tomio Kasahara, Hamamatsu; Tomotaro Makita, Nagoya, both of Japan

[73] Assignees: Mitsubishi Petrochemical Company Limited, Tokyo; Yuka Badische Co., Ltd., Yokkaichi, both of Japan

[21] Appl. No.: 681,972

[22] Filed: Apr. 30, 1976

[30] Foreign Application Priority Data

Apr. 30, 1975 Japan .............................. 50-52781

[51] Int. Cl.² .................................. A01G 31/00
[52] U.S. Cl. .................................................. 47/64
[58] Field of Search ............... 47/1.2, 37, DIG. 7, 47/34, 58

[56] References Cited

U.S. PATENT DOCUMENTS

| | | | |
|---|---|---|---|
| 2,175,113 | 10/1939 | Fischer | 47/1.2 |
| 2,713,749 | 7/1955 | Hult | 47/1.2 |
| 3,608,238 | 9/1971 | Reuter | 47/1.2 |
| 3,798,836 | 3/1974 | Rubens et al. | 47/1.2 |
| 3,927,491 | 12/1975 | Farnsworth | 47/1.2 |

FOREIGN PATENT DOCUMENTS

| | | | |
|---|---|---|---|
| 43-16769 | 7/1968 | Japan | 47/1.2 |
| 1,313,121 | 4/1973 | United Kingdom | 74/1.2 |
| 1,318,736 | 5/1973 | United Kingdom | 47/37 |

Primary Examiner—Robert E. Bagwill
Attorney, Agent, or Firm—Sughrue, Rothwell, Mion, Zinn and Macpeak

[57] ABSTRACT

A hydroponic container comprising a casing and a porous foam plate disposed on the surface of water contained in the casing, the porous foam plate consisting of an aggregate of foamed resin beads bonded to one another with continuous open spaces among adjacent beads, and a hydroponic method which comprises disposing a porous foam plate on the surface of water containing nutrients, the porous foam plate consisting of an aggregate of foamed resin beads bonded to one another with water permeable spaces among adjacent beads, and cultivating a plant on the porous foam plate.

17 Claims, 11 Drawing Figures

WATER

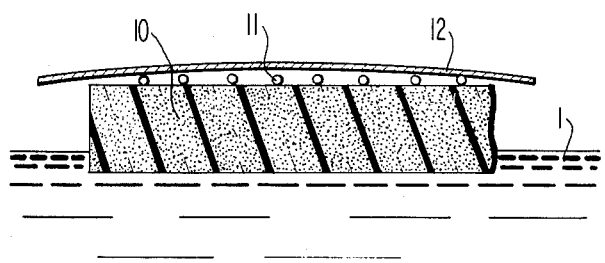
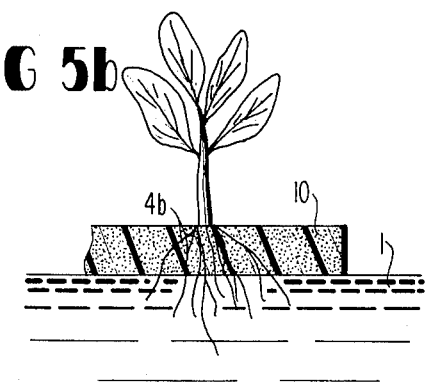
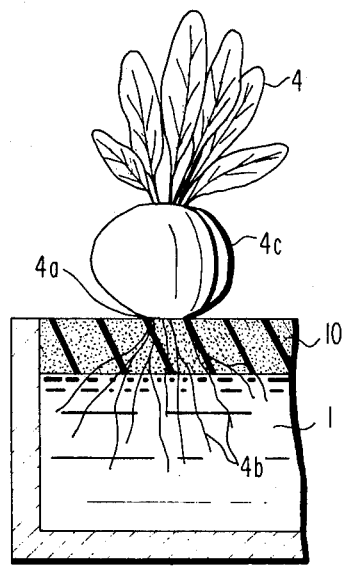
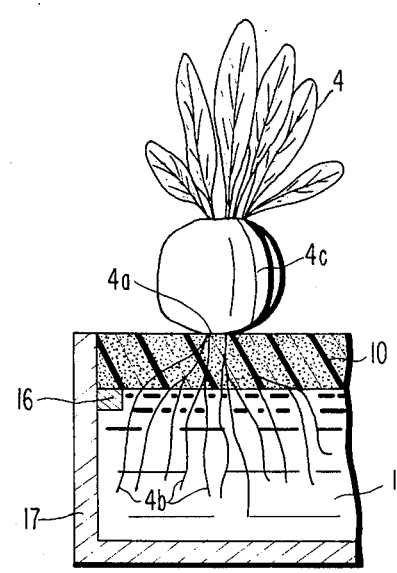
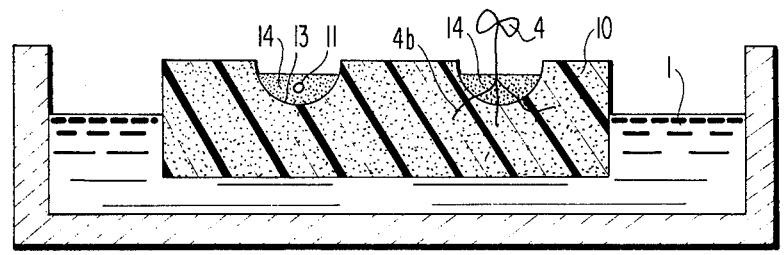

4,034,506

HYDROPONIC METHOD USING A POROUS FOAM PLATE, AND A CONTAINER USED THEREWITH

BACKGROUND OF THE INVENTION

1. Field of the Invention

This invention relates to a hydroponic method using a porous foam plate. More particularly, it relates to a hydroponic method which involves cultivating plants on a porous foam plate disposed on a water surface, the porous foam plate consisting of an aggregate of foamed resin beads, such as polyethylene or polystyrene, bonded to one another with continuous open spaces among adjacent beads, and to a container used therewith.

2. Description of the Prior Art

Hydroponics, sometimes called "aquiculture", is a process whereby plants are cultivated in water containing dissolved inorganic nutrients necessary for the growth of vegetables and other plants.

When it is desired to stabilize or support the stalk of a plant grown by such a hydroponic method, the conventional practice relies on the use of pebbles or an open celled polyurethane foam. According to the hydroponic method using pebbles which is illustrated in FIG. 1, a pot 2' is so supported by a plate 2 so that its lower part is located underwater 1, as shown in FIG. 1, pebbles 3 are placed therein, and the seeds of a plant 4 are sown in the pebbles. This method, however, suffers from the following defects.

1. Direct seeding causes the individual seeds to be situated at different depths, so that non-uniform budding or plant growth occurs.
2. Thinning of seedlings may result in moving the pebbles, and consequently may exert a harmful influence upon neighboring seedlings.
3. During thinning, the roots of the seedlings tend to be cut off. The roots remaining among the pebbles as a result of cutting rot and adversely affect the other seedlings.
4. In the case of radishes, the root portions grow very deep among the pebbles, and cannot be seen from the outside, which can lead to a selection of an inappropriate harvesting time.
5. In re-use, the pebbles need to be disinfected. Furthermore, since they are heavy, their handling requires a large amount of labor.

On the other hand, according to the hydroponic method using a polyurethane foam which is illustrated in FIGS. 2a and 2b, the seeds of a plant 4 are sown and grown on an open celled polyurethane foam sheet 5 disposed on the water surface, as shown in FIG. 2a. Root hairs 4b of the plant 4 growing from the joint of a stalk 4a (the area where roots grow from the stalk, which corresponds to the boundary between the soil and the open atmosphere in soil culture) extend into the polyurethane foam, and absorb water and nutrients. This method, however, has the following defects.

1. Since water is impregnated in large quntities into the entire area of the polyurethane foam sheet 5, the joint of a stalk 4a tends to become excessively laden with moisture, and, consequently, the root is liable to rot.
2. In view of disadvantage (1), the joint 4a must be placed apart from the polyurethane foam sheet 5 as the plant grows, which requires extra labor.
3. As in the case of using pebbles, the roots of the plant are susceptible to breakage at the time of thinning. As a result, the roots remaining in the polyurethane foam sheet 5 rot, and adversely affect other seedlings.
4. In the cultivation of radishes on the polyurethane foam sheet 5, lateral roots 4d occur as is shown in FIG. 2(b).

SUMMARY OF THE INVENTION

It is one object of this invention to provide a hydroponic method which is free from the defects of the conventional hydroponic techniques using pebbles or polyurethane foam sheets, and which can be practiced with lesser amounts of manual labor being required.

According to the present invention, there is provided a container for hydroponics comprising a casing and a porous foam plate disposed on the surface of water therein containing dissolved inorganic nutrients, the porous foam plate consisting of aggregates of foamed beads of a resin, such as polystyrene or polyethylene, bonded to one another with water permeable continuous open spaces among adjoining beads, which plate is adapted to cultivate plants thereon. In this hydroponic container, the distance between the joint 4a and the surface of the water containing the inorganic nutrient is maintained at a certain predetermined distance so that the joint 4a can be maintained at a moderate humidity without the necessity to move the plants during growth as is necessary for the prior art methods.

The hydroponic method in accordance with this invention can be applied to the cultivation of edible roots such as radishes, Japanese turnips or Kohlrabi; edible herbs such as trefoil, garland chrysanthemum, rape, shallot, leek, white-stemmed onions, cress, parsley, or celery; vegetable and fluits such as tomatos, eggplants, green peppers, chili peppers, cucumbers, melons, watermelons, Japanese cantaloupes, kidney beans, or podded peas; and floweres such as roses, chrysanthemums, aster, carnations, begonias, geraniums, tulips or daffodils.

BRIEF DESCRIPTION OF THE DRAWINGS

FIG. 2, b is a view illustrating the conventional hydroponic method using a polyurethane foam sheet where a radish is being cultivated;

FIG. 5, a, b, c and d illustrate the growth sequence of a plant cultivated in the hydroponic container shown in FIG. 4;

FIG. 6 is a view illustrating another embodiment of this invention; and

FIG. 7 is a view illustrating still another embodiment of this invention.

DETAILED DESCRIPTION OF THE INVENTION

The porous foam plate used in the present invention is produced by filling foamed polystyrene beads or foamed polyethylene beads, which have a particle diameter of about 2 to about 20 mm and a density of about 8 to about 50 g/liter and whose surfaces are coated with a liquid adhesive such as an acrylic emulsion, an asphalt emulsion or epoxy emulsion, into a mold cavity having a number of small apertures, and then drying and solidifying the adhesive by passing hot air about 20° C to about 80° C therethrough for about 5 to about 180 min. to bond the beads to each other.

The liquid adhesive used in this invention has a viscosity of about 50 to about 7,000 cps at 20° C, preferably 3 to 1,000 cps at 20° C, and contains solid component(s) in an amount of about 20 to about 60 wt% based on the total weight of the adhesive. Usually the liquid adhesive is used in an amount of about 0.1 to about 120 wt%, preferably 5 to 10 wt% based on the total weight of the foamed beads. The liquid adhesive of this invention may further contain a suspending agent such as dodecylbenzene sulfonate, polyvinyl pyrrolidone, polyvinyl alcohol, polyoxyethylene, nonylphenyl ether, sodium lauryl sulfonate, potassium phosphate, etc., and/or a catalyst or curing agent, e.g., organic amines such as ethylene diamine, diethylene triamine, metaphenylene diamine, dicyan diamide, a reaction product of glycidylstyrene, stearylpropylene diamine and ammonium, etc.

Preferred examples of the liquid adhesive include an acrylic emulsion consisting of 100 wt parts of an acrylic butyl ester/styrene/itaconic acid copolymer (42 wt% : 55 wt% : 3 wt% based on the total weight of monomers), 2 wt% of dodecylbenzen sulfonate as a suspending agent, and 100 wt parts of water; an asphalt emulsion consisting of 100 wt parts asphalt, 10 wt parts of ethyl alcohol, 8 wt parts of a reaction product of an amine, epichlorohydrine and the hydrochloric acid salt of an amine represented by the formula

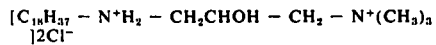

as a suspending agent, and 120 wt parts of water; and an epoxy emulsion consisting of 100 wt parts of a reaction product of bisphenol-A and epichlorohydrine represented by the formula

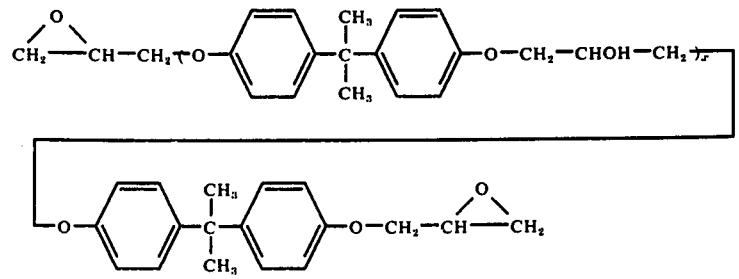

(commercially available as "Epicoat 828", a trademark for a product of Shell Kagaku Kabushiki Kaisha), 12 wt parts of diethyl terephthalate, 25 wt parts of a reaction product of glycidylstyrene, stearylpropylene diamine and ammonium represented by the formula

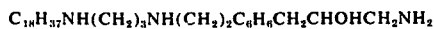

as a catalyst, 7 wt parts of a reaction product of an amine, epichlorohydrine and hydrochloric acid salt of an amine represented by the formula

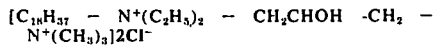

as a suspending agent, and 150 wt parts of water. Usually wating is conducted by dipping the foamed beads of a resin into a liquid adhesive contained in a vessel and then bringing them out of the vessel using a mesh screen or by adding a liquid adhesive to the foamed beads while blending them using a ribbon blender.

Figure 3:
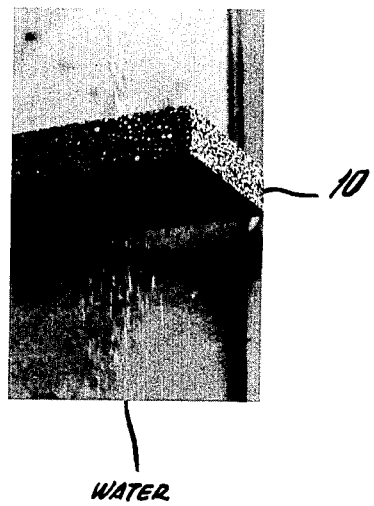
FIG. 3 is a view illustrating porous foam sheet prepared using an asphalt emulsion as a liquid adhesive in accordance with this invention.

As is shown in FIG. 3, the beads in the porous foam plate 10 partly adhere to one another at their surfaces, but not at their entire surfaces so that water permeable spaces are formed. The porous foamed plate has a water permeable porosity of about 20 to about 50 volume%. The water permeable porosity is determined by the following method. 600 cc of water is placed in a 1 liter measuring cylinder, and a sample (x cc) is completely submerged in the water. The increased amount (y cc) of water is measured, and the porosity is calculated in accordance with the following equation.

$$\text{Water permeable porosity (\%)} = \frac{x - y}{x} \times 100$$

$x$: the volume (cc) of the sample,
$y$: the increase (cc) of water when the sample is completely submerged in water The nutrients used in the hydroponic method of this invention are conventional and include, for example, $MgSO_4$, $Ca(NO_3)_2$, $KH_2PO_4$, $KCl$, $FeCl_2$, $(NH_4)_2SO_4$, $NaNO_3$, $Na_2HPO_4.12H_2O$, $NH_4NO_3$, $K_2O.B_2O_3.2.5H_2O$, $MnSO_4.7H_2O$ and $CuCl_2$, which can be used either alone or in admixture.

Although various recipes for hydroponically cultivating various kinds of plants will be obvious to one skilled in the art, the following culture solution, i.e., a 1:1 V/V mixture of A-liquid and B-liquid set forth below, it applicable for a wide variety of plants and will often be preferred for use in this invention:

| A-liquid | |
|---|---|
| Water | 1 liter |
| $NH_4NO_3$ | 0.0575 g |
| $KH_2PO_4$ | 0.0383 g |
| KCl | 0.043 g |
| $MgSO_4 . 7H_2O$ (pH 5 – 7) | 0.245 g |
| B-liquid | |
| Water | 1 liter |
| $Ca(NO_3)_2$ | 0.117 g |
| 6%$FeCl_3$ (or $Fe_2O_3$) | 0.1 – 0.5 mol |
| HCl (pH 5 – 7) | slight amount |

The A- and B-liquids are mixed with each other before use. If desired, the above mixture may further contain a trace amount of $K_2O.B_2O_3.2.5H_2O$ and/or $MnSO_4.7H_2O$.

One embodiment of this invention will be described in detail with reference to FIGS. 4 and 5.

Figure 1:
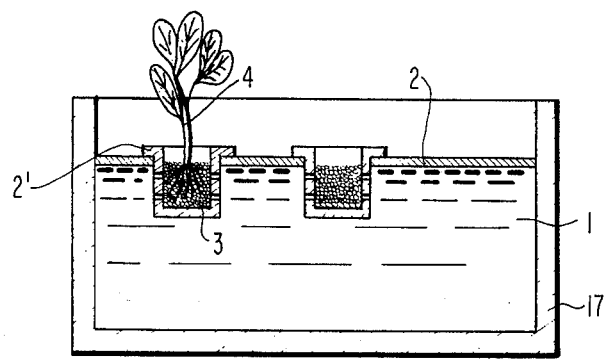
FIG. 1 is a view illustrating a conventional hydroponic method using pebbles.
Figure 2A:
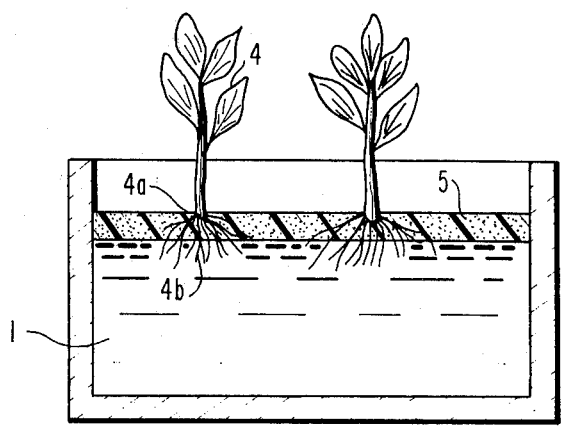
FIG. 2, a is a view illustrating a conventional hydroponic method using a polyurethane foam sheet.
Figure 2B:
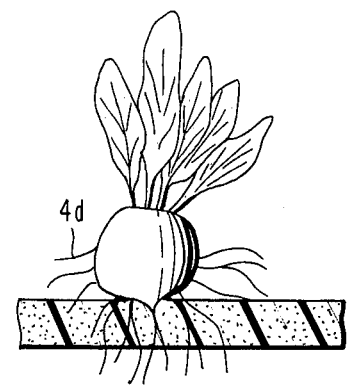
Figure 4:
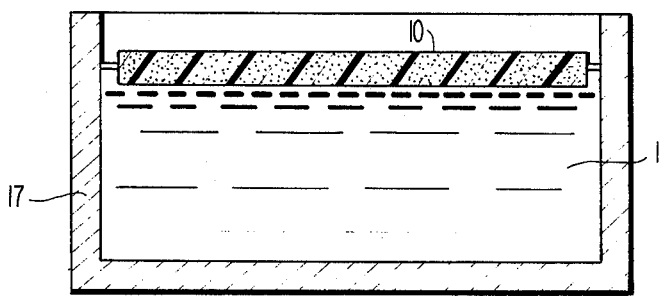
FIG. 4 is a view illustrating one embodiment of this invention.

As shown in FIG. 4, a porous foam plate 10 provided with water permeable spaces having a thickness of 25 mm and a porosity of 37 volume%, which comprises an aggregate of spherical beads of closed cell polystyrene foam with a diameter of about 10 mm bonded to one another by an epoxy resin emulsion adhesive, is floated on the surface of water 1 in a casing 12.

A part of the porous foam plate 10 which is floating on the surface of the water 1 submerges in the water to a suitable depth according to its thickness, and the distance between the top surface of the plate and the water surface is maintained at a constant value irrespective of the amount of water.

As is shown in FIG. 5 a, seeds 11 are sown on the porous foam plate 10, and covered with a moist paper sheet 12. The seeds 11 bud in two or three days, and their root hairs 4b extend into water 1 through the spacings in the porous foam plate 10, as is shown in FIG. 5 b. At this time, the paper sheet 12 is taken off, and a conventional thinning performed.

In the case of cultivating radishes as shown in FIG. 5 c, when the plant 4 has grown, the edible portion 4c exists substantially completely on the porous foam plate 10, and the roct hairs 4b extend into water 1, as shown in FIG. 5 c.

During the initial growth period of any plant, the distance between the top surface of the porous plate 10 and the water surface is maintained substantially constant and the joint 4a is maintained at a moderate moisture level without any human control and root rotting is not encountered.

When the plant 4 further grows and increases in size, the porous foam plate 10 sinks due to the increased weight of the plant. Furthermore, when the joint 4a approaches the water surface, the growth of the plant 4 is retarded. In such a case, the water surface is relatively lowered. by about 5 mm to about 4 cm from the bottom of the porous foam plate 10 as shown in FIG. 5 d, for example, by lifting the plate 10 on a suitable support 16 or by maintaining the plate 10 at one level and dropping the water level. When the water surface is thus lowered below the bottom of the porous foam plate 10, oxygen supply increases, and the root hairs 4b further grow. Consequently, the edible portion 4c of the plant 4 becomes bigger. The plant is harvested when it has grown to the desired degree.

The size and structure of the porous foam plate 10 used in the present invention are as follows:

1. Thickness: about 5 to about 35 mm, preferably 15 to 25 mm.

If the thickness is less than about 5 mm, the border 4a becomes excessively laden with moisture as a result of water rising due to a capillary phenomenon when the porous foam plate 10 is floating on the water. If the thickness is above about 35 mm, the plate tends to be too dry and such is not desirable for the growth of the plant.

2. Structure:

Small beads, such as granules or pillar-like particles, of a plastic foam having many closed cells, such as foamed polystyrene or foamed polyethylene, are bonded to one another so that continuous open spaces are formed, and fabricated into a plate shape. The size of the continuous open spaces depends on the diameter of the beads, and, of course, the density of the closed cells is equal to that of the beads.

3. Beads:

Since the foam particles have a large number of closed cells, they hardly contain water, and the material of the beads is resistant to wetting with water (that is to say, it has a low water retention capability).

The beads have a density of about 8 g/liter to about 50 g/liter, preferably 8 g/liter to 30 g/liter, and a size of about 2 mm to about 20 mm, preferably 4 mm to 16 mm. If the size is less than about 2 mm, the root growth tends to be inhibited, and the plate becomes excessively moisture laden. If it is above about 20 mm, the plate tends to become too dry and a shortage of water is encountered. Furthermore, when small seeds are sown, they tend to drop out from the plate into water.

4. Bulk density of the porous foam plate: The porous foamed plate has a bulk density of about 8 to about 50 g/liter, preferably 10 to 30 g/liter. If it is below 8 g/liter, the porous foam plate floats too high on the water surface, and it is difficult to keep the seeds wet. If the bulk desity is more than about 50 g/liter, the porous foam plate sinks too deep below the water surface, and the plate contacting area of the seeds or seedlings becomes too laden with moisture, and root rotting is liable to occur.

Another embodiment of this invention is shown in FIG. 6, where a bed consisting of the above porous foam plate 10 has recesses 13 provided for seeding, the insetion of cuttings, or transplanting, and a water retaining substance 14 is filled in the recesses 13, the assembly being disposed on the water surface and hydroponics practised using such a container.

The water retaining substance if not particularly limited so long as it is porous or has projections or ciliary process and includes perlite, vermiculite, lava sand, pumice sand, volcanic ashes, charcoal, leaf mold, sphagna, or peat, either alone or in admixture.

The size of the recesses is generally chosen according to the purpose of use such as seeding, insertion of cuttings, or transplanting. Generally, each recess or hole has a diameter of about 5 to about 70 mm, and a depth of about 3 to about 60 mm.

Since the water is held by the water retaining substance 14 during the growth of the roots of plant in the porous foam plate in this type of hydroponic container, the seeds of a plant can be directly sown without using the moist paper sheet 12 described above, and, also, cuttings can be inserted in the recesses or transplanting can also be made therein. Such an embodiments offers practical advantages.

Since, according to the present invention, a porous foam plate consisting of an aggregate of foamed beads of a resin such as polystyrene or polyethylene bonded to one another with water permeable spaces among adjoining beads is disposed on a water surface, and a plant is cultivated on the plate, the top surface of the plate, that is, the joint of a plant, can be kept at a desired moisture level.

Another advantage of the present invention is that the root hairs can be easily pulled off from the porous foam plate, thinning is easy, and harvesting can be conveniently performed. Consequently, roots do not remain in the porous foam plate, and, therefore, do not undergo rotting. This prevents any adverse effects on other seedlings, and the porous foam plate can be reused. In addition, the roots grow without resistance in the porous foam plate, and since the supply of oxygen is sufficient, plants grow rapidly and are not infected with diseases.

The following Examples illustrate the present invention more specifically.

REFERENCE EXAMPLE 5,000 wt parts of expandable polystyrene beads containing 1.7 wt % n-butane and 6.8 wt % of isobutane based on the total weight of the polystyrene resin composition were steam-heated to obtain foamed polystyrene beads, 0.017 g/cc and a particle size of 5 to 7 mm, which then were blended using a conventional ribbon blendor with 5300 parts of an acrylic emulsion having the following composition.

| | |
|---|---|
| Acrylic butyl ester / styrene / itaconic acid copolymer (42 wt % : 55 wt % : 3 wt %) | 100 wt parts |
| Suspending agent (Dodecylbenzene Sulfonate) | 2 wt parts |
| Water | 100 wt parts |

The thus coated beads were filled into the cavity (width : 1000 mm; length : 1300 mm; height : 300 mm) of a conventional mold having a number of apertures whose diameter is 1 mm. Hot air (80° C) was introduced into the cavity for 30 minutes to dry the acrylic emulsion and bond the beads to each other.

After the completion of drying, the mold was allowed to stand for 5 minutes in air (20° C).

The thus obtained foamed plate having a density of 0.033 g/cc and a porosity of 37 % was stored for two days and then was cut into pieces having a thickness of 25 mm.

EXAMPLE 1

Radish seeds were sown on the porous foam plate obtained according to the method of Reference Example in a hydroponic container of the type as disclosed in FIG. 4. The porous foam plate had a thickness of 25 mm and a porosity of 37 volume % and was made of an aggregate of polystyrene foam beads with a density of 17 g/liter and a particle diameter of about 10 mm which were bonded to one another. The thickness of that portion of the plate which was below the level of nutrient solution was 3 mm. The composition of nutrient solution used was prepared by mixing A-liquid with B-liquid in a proportion of 1:1 v/v before use, the composition of the A-liquid and B-liquid being as set forth below.

| | | |
|---|---|---|
| A-liquid | | |
| Water | | 1 liter |
| $NH_4NO_3$ | | 0.0575 g |
| $KH_2PO_4$ | | 0.0383 g |
| KCl | | 0.043 g |
| $MgSO_4 . 7H_2O$ | | 0.245 g |
| pH | | 6 |
| B-liquid | | |
| Water | | 1 liter |
| $Ca(NO_3)_2$ | | 0.117 g |
| 6 % $FeCl_3$ | | 0.2 mol |
| HCl | | trace |
| pH | | 7 |

Immediately after seeding, a tissue paper moistened with water was placed on the seeds as shown in FIG. 5a. When the tissue paper was removed three days later, about 80% of the seeds were found to have budded. Ten days later, the seedlings were thinned. No root cutting occurred during thinning. The removed seedlings could also be transplanted. The edible roots of the radish were observed to have become fairly large (as shown in FIG. 5c or 5d on the 30th day and thereafter, and radishes without lateral roots could be harvested. Since hardly any root hairs remained in the porous only small amounts of remaining root hairs.

This hydroponic method was found to be very convenient as compared with conventional hydroponic methods using pebbles or a polyurethane foam with which the removal of root hairs was very time consuming.

EXAMPLE 2

Radish seeds were sown in recesses containing a water retaining substance in the porous foam plate obtained according to the method of Reference Example above in a hydroponic container of the type shown in FIG. 6 containing the same nutrient solution as Example 1. The porous foam plate had a thickness of 25 mm. Each of the recesses was cylindrical in shape and had a diameter of 20 mm and a depth of 5 mm. Charcoal was placed in the recesses as the water retaining substance. The porous foam plate consisted of an aggregate of spherical foamed polystyrene beads with a density of 17 g/liter and a diameter of about 10 mm. The thickness of the portion of the porous foam plate which was below the water surface was 3 mm.

Three days after seeding, about 90% of the seeds had budded. The edible roots of the radishes were found to be considerably large at the 30th day after seeding, and thereafter a radish like that shown in FIG. 5c could be harvested.

In this Example, the top surface of the porous foam plate was depressed to form the recesses 13. This can be modified, however, as shown in FIG. 7 which shows that recesses 13' are formed in annular raised portions 10a or bonding partitions on the top surface of the plate.

While the invention has been described in detail and with reference to specific embodiments thereof, it will be apparent to one skilled in the art that various changes and modifications can be made therein without departing from the spirit and scope thereof.

What we claim is:

1. A hydroponic container comprising a casing and a porous about 5 to about 35 mm thick foam plate having a porosity of about 20 to about 50 percent and a bulk density of about 8 to about 50 g/liter disposed on the surface of water contained in said casing, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads.

2. The hydroponic container of claim 1 wherein the porous foam plate consists of an aggregate of foamed polystyrene or polyethylene beads having a density of about 8 to about 50 g/liter and a diameter of about 2 to about 20 mm which are bonded to one another.

3. The hydroponic container of claim 1 wherein the liquid adhesive is selected from the group consisting of an acrylic emulsion and an asphalt emulsion.

4. The hydroponic container of claim 3 wherein the acrylic emulsion is an acrylic butyl ester-styrene-itaconic acid copolymer emulsion.

5. A hydroponic container comprising a casing and a porous about 5 to about 35 mm thick foam plate having a porosity of about 20 to about 50 percent and a bulk density of about 8 to about 50 g/liter disposed on the surface of water contained in said casing, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads and having foamed thereon recesses filled with a water-retaining substance.

6. The hydroponic container of claim 5 wherein the porous foam plate consists of an aggregate of foamed polystyrene or polyethylene beads hving a density of about 8 to about 50 g/liter and a diameter of about 2 to 20 mm which are bonded to one another.

7. The hydroponic container of claim 5 wherein the water-retaining substance is at least one substance selected from the group consisting of perlite, vermiculite, lava sand, pumice sand, volcanic ashes, characoal, leaf mold, sphagna, or peat, either alone or in admixture.

8. The hydroponic container of claim 5 wherein the liquid adhesive is selected from the group consisting of an acrylic emulsion and an asphalt emulsion.

9. The hydroponic container of claim 8 wherein the acrylic emulsion is an acrylic butyl ester-styrene-itaconic acid copolymer emulsion.

10. A hydroponic method which comprises disposing a porous about 5 to about 35 mm thick foam plate having a porosity of about 20 to about 50 percent and a bulk density of about 8 to about 50 g/liter on the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with water-permeable spaces among adjacent beads; and cultivating a plant on the porous foam plate.

11. A hydroponic method which comprises disposing a porous about 5 to about 35 mm thick foam plate having a porosity of about 20 to about 50 percent and a bulk density of about 8 to about 50 g/liter on the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads and having formed thereon recesses filled with a water-retaining substance; and sowing seeds of a plant in the water-retaining substance in each of the recesses.

12. A hydroponic method which comprises disposing a porous about 5 to about 35 mm thick foam plate having a porosity of about 20 to about 50 percent and a bulk density of about 8 to about 50 g/liter on the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads and having formed thereon recesses filled with a water-retaining substance; and inserting cuttings or transplanting seedlings in each of the recesses.

13. A hydroponic container comprising a casing and a porous about 5 to about 35 mm thick foam plate having a porosity of about 20 to about 50 percent and a bulk density of about 8 to about 50 g/liter supported by means of supporting means provided on the inner wall of said casing to maintain the bottom of the porous foam plate at a certain predetermined distance from the surface of water contained in said casing, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads.

14. A hydroponic container comprising a casing and a porous about 5 to about 35 mm thick foam plate having a porosity of about 20 to about 50 percent and a bulk density of about 8 to about 50 g/liter supported by means of supporting means provided on the inner wall of said casing to maintain the bottom of the porous foam plate at a certain predetermined distance from the surface of water combined in said casing, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads and having foamed thereon recesses filled with a water-retaining substance.

15. A hydroponic method which comprises maintaining a porous about 5 to about 35 mm thick foam plate having a porosity of about 20 to about 50 percent and a bulk density of about 8 to about 50 g/liter at a certain predetermined distance from the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with water-permeable spaces among adjacent beads; and cultivating a plant on the porous foam plate.

16. A hydroponic method which comprises maintaining a porous about 5 to about 35 mm thick foam plate having a porosity of about 20 to about 50 percent and a bulk density of about 8 to about 50 g/liter at a certain predetermined distance from the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adjacent beads and having formed thereon recesses filled with a water-retaining substance; and sowing seeds of a plant in the water-retaining substance in each of the recesses.

17. A hydroponic method which comprises maintaining a porous about 5 to about 35 mm thick foam plate having a porosity of about 20 to about 50 percent and a bulk density of about 8 to about 50 g/liter at a certain predetermined distance from the surface of water containing nutrients, said porous foam plate consisting of an aggregate of foamed, essentially hydrophobic, substantially closed cell resin beads having been bonded to one another with a liquid adhesive of a viscosity of about 50 to about 7,000 cps at 20° C., and containing solids in an amount of about 30 to about 60 weight percent based on the total weight of the adhesive, with continuous open spaces among adajacent beads and having formed thereon recesses filled with a water-retaining substance; and inserting cuttings or transplanting seedlings in each of the recesses.

* * * * *